US008472389B2

(12) United States Patent
Imamura et al.

(10) Patent No.: US 8,472,389 B2
(45) Date of Patent: Jun. 25, 2013

(54) RADIO RESOURCE MANAGEMENT DEVICE, RADIO COMMUNICATION BASE STATION DEVICE, AND RADIO RESOURCE MANAGEMENT METHOD

(75) Inventors: Daichi Imamura, Kanagawa (JP); Seigo Nakao, Kanagawa (JP); Akihiko Nishio, Kanagawa (JP); Sadaki Futagi, Ishikawa (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 12/678,725

(22) PCT Filed: Sep. 19, 2008

(86) PCT No.: PCT/JP2008/002595
§ 371 (c)(1),
(2), (4) Date: Mar. 17, 2010

(87) PCT Pub. No.: WO2009/037854
PCT Pub. Date: Mar. 26, 2009

(65) Prior Publication Data
US 2010/0260116 A1 Oct. 14, 2010

(30) Foreign Application Priority Data
Sep. 21, 2007 (JP) ................................. 2007-246270

(51) Int. Cl.
*H04W 4/00* (2009.01)
(52) U.S. Cl.
USPC .......................................... 370/329; 455/450
(58) Field of Classification Search
None
See application file for complete search history.

(56) References Cited

U.S. PATENT DOCUMENTS

2004/0057400 A1* 3/2004 Walsh et al. .................. 370/329
2004/0152480 A1* 8/2004 Willars et al. ................ 455/513

FOREIGN PATENT DOCUMENTS

| JP | 8-116567 | 5/1996 |
| JP | 2002-345016 | 11/2002 |
| JP | 2003-46517 | 2/2003 |

OTHER PUBLICATIONS

International Search Report dated Oct. 21, 2008.
3GPP TSG RAN WG1 Meeting #49bis, "Clarification of Implicit Resource Allocation of Uplink ACK/NACK Signal," Panasonic, R1-072798, Jun. 2007, pp. 1-2.
3GPP TSG RAN WG1 Meeting #50, "LTE downlink ACK channel mapping linked to CCE," Samsung, R1-073561, Aug. 2007, 3 pages.
3GPP TSG RAN WG1 Meeting #49, "Multiplexing capability of CQIs and ACK/NACKs form different UEs," Nokia Siemens Networks, Nokia, R1-072315, May 2007, 4 pages.
3GPP TSG RAN WG1#49, "Allocation of UL ACK/NACK index," LG Electronics, R1-072348, May 2007, pp. 1-4.
3GPP TSG RAN WG1 Meeting #50, "Signaling of Implicit ACK/NACK resources," Nokia Siemens Networks, Nokia, R1-073661, Aug. 2007, 8 pages.
3GPP RAN WG1 Meeting #49bis, "Implicit mapping of CCE to UL ACK/NACK resource," Samsung, R1-073122, Jun. 2007, pp. 1-4.

(Continued)

*Primary Examiner* — Jianye Wu
(74) *Attorney, Agent, or Firm* — Dickinson Wright PLLC

(57) ABSTRACT

A radio resource management apparatus and radio resource management method, the radio resource management apparatus including a resource allocation section that, when a plurality of control channel elements are allocated to a physical downlink control channel for downlink data transmission, generates resource allocation information on control channel element numbers corresponding to the plurality of control channel elements, such that the control channel element numbers are different between neighboring cells, and a reporting section that reports an allocation result in the resource allocation section to a subordinate radio communication base station apparatus.

4 Claims, 11 Drawing Sheets

OTHER PUBLICATIONS

3GPP TSG RAN WG1 #50, "Simultaneous ACK/NAK and SR Transmission in Uplink," Texas Instruments, R1-073430, Aug. 20-24, 2007, pp. 1-6.
TSG RAN WG1 meeting #50, "CCE to RE interleaver design criteria," Huawei, R1-073510, Aug 20-24, 2007, pp. 1-7.
3GPP TSG RAN WG1 Meeting #50, "Signaling parameters for UL ACK/NACK resources," Panasonic, R1-073616, Aug. 20-24, 2007, pp. 1-3.
TSG-RAN WG1#48Bis, "Frequency Hopping Pattern for EUTRA Uplink," NEC Group, R1-071504, Mar. 26-30, 2007, pp. 1-4.

* cited by examiner

CELL #A

| CYCLIC SHIFT SEQUENCE | WALSH SEQUENCE | | |
|---|---|---|---|
| | 0 | 1 | 2 |
| 0 | CCE#0 | | |
| 1 | | CCE#4 | |
| 2 | | | CCE#8 |
| 3 | CCE#1 | | |
| 4 | | CCE#5 | |
| 5 | | | CCE#9 |
| 6 | CCE#2 | | |
| 7 | | CCE#6 | |
| 8 | | | CCE#10 |
| 9 | CCE#3 | | |
| 10 | | CCE#7 | |
| 11 | | | CCE#11 |

CELL #B

| CYCLIC SHIFT SEQUENCE | WALSH SEQUENCE | | |
|---|---|---|---|
| | 0 | 1 | 2 |
| 0 | | | CCE#4 |
| 1 | CCE#8 | | |
| 2 | | CCE#0 | |
| 3 | CCE#9 | | CCE#5 |
| 4 | | CCE#1 | |
| 5 | | | CCE#6 |
| 6 | CCE#10 | CCE#2 | |
| 7 | | | CCE#7 |
| 8 | | CCE#3 | |
| 9 | | | |
| 10 | CCE#11 | | |
| 11 | | | |

CELL #C

| CYCLIC SHIFT SEQUENCE | WALSH SEQUENCE | | |
|---|---|---|---|
| | 0 | 1 | 2 |
| 0 | | CCE#7 | |
| 1 | | | CCE#3 |
| 2 | CCE#8 | CCE#4 | |
| 3 | | | CCE#0 |
| 4 | CCE#9 | | |
| 5 | | CCE#5 | |
| 6 | | | CCE#1 |
| 7 | CCE#10 | | |
| 8 | | CCE#6 | |
| 9 | | | CCE#2 |
| 10 | | | |
| 11 | CCE#11 | | |

RADIO RESOURCE MANAGEMENT DEVICE, RADIO COMMUNICATION BASE STATION DEVICE, AND RADIO RESOURCE MANAGEMENT METHOD

TECHNICAL FIELD

The present invention relates to a radio resource management apparatus, a radio communication base station apparatus and a radio resource management method.

BACKGROUND ART

In mobile communications, automatic repeat request ("ARQ") is applied to downlink data from a radio communication base station apparatus (hereinafter "base station") to radio communication mobile station apparatuses (hereinafter "mobile stations"). With ARQ, mobile stations feed back response signals representing error detection results of downlink data, to a base station. To be more specific, the mobile stations perform CRC (Cyclic Redundancy Check) check for uplink data, and, if CRC=OK (no error), feed back an ACK (ACKnowledgment), and, if CRC=NG (error present), feed back a NACK (Negative ACKnowledgment), as a response signal to the base station. These response signals are transmitted to the base station using an uplink control channel, for example, a PUCCH (Physical Uplink Control Channel) and an uplink L1/L2 CCH (L1/L2 Control Channel).

Further, as shown in FIG. 1, studies are underway to code-multiplex response signals transmitted from a plurality of mobile stations by spreading response signals using CAZAC (Constant Amplitude Zero Auto Correlation) sequences and Walsh sequences (see Non-Patent Document 1). In FIG. 1, [$W_0, W_1, W_2, W_3$] represent a Walsh sequence of a sequence length of 4. As shown in FIG. 1, in a mobile station, an ACK or NACK response signal is subject to first spreading to one SC-FDMA (Single Carrier-Frequency Division Multiple Access) symbol by a CAZAC sequence (with a sequence length of 12) in the frequency domain first. Next, the mobile station associates the response signal after the first spreading with $W_0$ to $W_3$ and performs an IFFT (Inverse Fast Fourier Transform). By this IFFT, the response signal spread by the CAZAC sequence of a sequence length of 12 in the frequency domain is converted to a CAZAC sequence of a sequence length of 12 in the time domain. Then, the signal after the IFFT is secondly spread using a Walsh sequence (with a sequence length of 4). That is, one response signal is assigned to each of four SC-FDMA symbols $S_0$ to $S_3$. Likewise, other mobile stations spread response signals using a CAZAC sequence and a Walsh sequence. Different mobile stations use CAZAC sequences of different amounts of cyclic shift in the time domain or use different Walsh sequences.

Here, the sequence length of a CAZAC sequence in the time domain is 12, so that it is possible to use twelve CAZAC sequences of amounts of cyclic shift "0" to "11" generated from the same CAZAC sequence. Also, the sequence length of a Walsh sequence is 4, so that it is possible to use four different Walsh sequences. Consequently, in an ideal communication environment, it is possible to code-multiplex response signals from maximum forty-eight (12×4) mobile stations.

Meanwhile, in mobile stations, CAZAC sequences of different amounts of cyclic shift between mobile stations are used as ACK/NACK reference signals (hereinafter "RSs (reference signals)"), RSs are subject to second spreading using a spreading code ($F_0, F_1, F_2$) of sequence length of 3. Consequently, in an ideal communication environment, it is possible to code-multiplex maximum thirty-six (12×3) response signals from the mobile stations.

Here, the cross-correlation between CAZAC sequences between varying amounts of cyclic shift generated from the same CAZAC sequence, is zero. Consequently, in an ideal communication environment, correlation processing in the base station makes it possible to separate a plurality of response signals spread by CAZAC sequences of varying amounts of cyclic shift (the amounts of cyclic shift 0 to 11) and code-multiplexed, without inter-code interference in the time domain.

However, a plurality of response signals transmitted from a plurality of mobile stations do not all arrive at the base station at the same time due to the difference of transmission timings between mobile stations, the influence of multipath delayed waves, frequency offset, and so on. For example, when the transmission timing of a response signal spread by the CAZAC sequence of the amount of cyclic shift "0" is delayed from the correct transmission timing, the correlation peak of the CAZAC sequence of the amount of cyclic shift "0" may appear in the detection window for the CAZAC sequence of the amount of cyclic shift "1." Further, when there is a delayed wave in a response signal spread by a CAZAC sequence of the amount of cyclic shift "0," an interference leakage due to that delayed wave may appear in the detection window for the CAZAC sequence of the amount of cyclic shift "1." In these cases, the CAZAC sequence of the amount of cyclic shift "1" is interfered with the CAZAC sequence of the amount of cyclic shift "0." Consequently, in these cases, the performance of separation between the response signal spread by the CAZAC sequence of the amount of cyclic shift "0" and the response signal spread by the CAZAC sequence of the amount of cyclic shift "1" degrades. Therefore, if CAZAC sequences of adjacent amounts of cyclic shift are used, the performance for separating response signals may degrade.

Therefore, conventionally, if a plurality of response signals are code-multiplexed by spreading of CAZAC sequences, a cyclic shift interval is provided between CAZAC sequences to reduce inter-code interference between CAZAC sequences. For example, studies are underway to use, when the cyclic shift interval between CAZAC sequences is 2, only six CAZAC sequences of amounts of cyclic shift "0," "2," "4," "6," "8" and "10" or "1," "3," "5," "7," "9" and "11" for the first spreading of a response signal among twelve CAZAC sequences of the amounts of cyclic shift "0" to "12." Therefore, if a Walsh sequence of a sequence length of 4 is used for second spreading of a response signal, it is possible to code-multiplex response signals from maximum twenty-four (6×4) mobile stations.

Further, a base station transmits control information for reporting a resource allocation result of downlink data to mobile stations. This control information is transmitted to mobile stations using mobile station-specific downlink control channels including PDCCHs (Physical Downlink Control Channels), downlink L1/L2 CCHs (L1/L2 Control Channels), DL Grant (Downlink scheduling Grant), and so on. Each PDCCH occupies one or a plurality of CCEs (Control Channel Elements). When one PDCCH occupies a plurality of CCEs, one PDCCH occupies a plurality of consecutive CCEs. According to the number of CCEs required to report control information, the base station allocates either PDCCH in a plurality of PDCCHs to each mobile station, and maps control information to physical resources corresponding to the CCEs occupied by PDCCHs, to transmit the control information.

Further, to eliminate the need for signaling for reporting the PUCCHs to use to transmit response signals from the base station to mobile stations, and to use downlink resources efficiently, studies are underway to associate CCEs with PUCCHs on a one-by-one basis. According to this association, each mobile station is able to identify the PUCCH to use to transmit a response signal from the mobile station, from CCEs corresponding to physical resources to which control information for the mobile station is mapped. Consequently, each mobile station maps a response signal from the mobile station, to the physical resources of the PUCCH based on the CCE corresponding to the physical resources to which control information for the mobile station is mapped.

Here, the number of CCEs occupied by a PDCCH varies depending on the modulation scheme and coding rate (MCS: Modulation and Coding Scheme) of the PDCCH. When a mobile station is located distant from the base station and the received quality at the mobile station is poor, the base station lowers the MCS level of the PDCCH (i.e. lowers the M-ary modulation number or the coding rate) while increasing the number of CCEs. Further, when a mobile station is located near the base station and the received quality at the mobile station is high, the base station raises the MCS level of the PDCCH (i.e. raises the M-ary modulation number or the coding rate) while decreasing the number of CCEs. That is, a PDCCH of a low MCS level occupies a large number of CCEs and a PDCCH of a high MCS level occupies a small number of CCEs. In other words, the number of CCEs for a mobile station to which a PDCCH of a low MCS level is allocated, is great, and the number of CCEs for a mobile station to which a PDCCH of a high MCS level is allocated, is small. If a coding rate of the PDCCH is either $2/3$, $1/3$ or $1/6$ and the PDCCH of coding rate $2/3$ occupies one CCE, the PDCCH of a coding rate $1/3$ occupies two CCEs, the PDCCH of a coding rate $1/6$ occupies four CCEs.

Then, studies are underway to transmit, when a plurality of CCEs are allocated to one mobile station in this way, from a mobile station an ACK/NACK response signal using only a PUCCH associated with the CCE of the smallest number among a plurality of CCEs (see Non-Patent Document 2).

An ACK/NACK response signal transmitted as a PUCCH is signal produces long data transmission delay when a detection error occurs, and therefore an ACK/NACK response signal is generally transmitted so that the error detection rate becomes lower. In mobile communication systems using multi cells, as one approach to reduce the error detection rate, studies are conducted for the method of reducing inter-cell interference (inter-code interference) from neighboring cells.

With allocation method of CCEs and response signal resources disclosed in Non-Patent Document 3, studies are conducted for the method of reducing inter-cell interference (inter-code interference) of response signals transmitted at the same time and in the same frequency by allocating response signal resources differently between neighboring cells. To be more specific, as shown in FIG. 2, as for cyclic shift sequence, one of ACK/NACK transmission parameters, Non-Patent Document 3 discloses the method of reducing inter-cell interference by making a cyclic shift sequence used in a cell different between cells (cell #A, cell #B and cell #C in the figure).

Further, according to Non-Patent Documents 2 and 4, uplink ACK/NACK resources are reported without signaling by allocating the ACK/NACK resources to CCEs to which PDCCHs are allocated on a one-by-one basis, and the method of transmitting an ACK/NACK response signal is disclosed when a PDCCH is transmitted using a plurality of CCEs, for example, using ACK/NACK resources corresponding to the head CCE.

Non-Patent Document 1: R1-072315, Nokia Siemens Networks, Nokia, "Multiplexing capability of CQIs and ACK/NACKs form different UEs," 3GPP TSG-RAN WG1 Meeting #48bis, St. Julians, Malta, Mar. 26-30, 2007
Non-Patent Document 2: R1-072348, LG Electronics, "Allocation of UL ACK/NACK index", 3GPP TSG-RAN WG1 Meeting #49, Kobe, Japan, May 7-11, 2007
Non-Patent Document 3: R1-073661, Nokia Siemens Networks, Nokia, "Signaling of Implicit ACK/NACK resources" 3GPP TSG RAN WG1 Meeting #49bis, Orlando, USA, Jun. 25-29, 2007
Non-Patent Document 4: R1-073122, Samsung, "Implicit mapping of CCE to UL ACK/NACK resource," 3GPP TSG-RAN WG1 Meeting #49bis, Orlando, USA, Jun. 25-39, 2007

DISCLOSURE OF INVENTION

Problems to be Solved by the Invention

Although, with the above conventional method, by allocating cyclic shift sequences of the varying amounts of cyclic shift and varying orthogonal sequences (i.e. Walsh sequences) between neighboring cells, it is possible to reduce inter-cell interference (i.e. inter-code interference) between response signals, the number of code resources that can be used per cell (i.e. the number of cyclic shift sequences×Walsh sequences) is reduced when the number of neighboring cells increases.

Further, when a plurality of CCEs are allocated for PDCCH transmission, cyclic shift sequences and orthogonal sequences (Walsh sequences) that are not used are produced, and therefore, the number of code resources that can be used per cell (i.e. the number of cyclic shift sequences×Walsh sequences) is reduced.

If the number of code resources that can be used per cell is reduced in this way, the number of ACK/NACKs that can be transmitted is limited, and therefore, the number of PDCCHs is limited. By this means, the number of PDSCHs to form pairs with PDCCHs are limited.

It is therefore an object of the present invention to provide a radio resource management apparatus, a radio communication base station apparatus and a radio resource management method that reduce inter-cell interference of response signals and reduce the decrease in the number of ACK/NACKs that can be transmitted.

Means for Solving the Problem

The radio resource management apparatus of the present invention adopts the configuration including: a resource allocation section that, when a plurality of control channel elements are allocated to a physical downlink control channel for downlink data transmission, makes control channel element numbers to use different between neighboring cells; and a reporting section that reports an allocation result in the resource allocation section to a subordinate radio communication base station apparatus.

The radio communication base station apparatus of the present invention adopts the configuration including: a transmitting section that, when a plurality of control channel elements are allocated to a physical downlink control channel for downlink data transmission, transmits control channel element numbers different from control channel element numbers in a neighboring cell to a radio communication terminal apparatus; and a receiving section that receives an acknowledgment or negative acknowledgment response signal transmitted from the radio communication terminal apparatus using a physical uplink control channel resource corresponding to the control channel element numbers transmitted to the radio communication terminal apparatus.

The radio resource management method of the present invention includes steps of: when a plurality of control channel elements are allocated to a physical downlink control channel for downlink data transmission, a resource allocation step of making control channel element numbers to use different between neighboring cells; and a reporting step of reporting an allocation result in the resource allocation step to a subordinate radio communication base station apparatus.

Advantageous Effects of Invention

According to the present invention, it is possible to reduce inter-cell interference of response signals and reduce the decrease in the number of ACK/NACKs that can be transmitted.

BRIEF DESCRIPTION OF DRAWINGS

FIG. 2 explains a technique disclosed in Non-Patent Document 3;

FIG. 10A shows allocation of CCE numbers in ascending order;

FIG. 10B shows allocation of CCE numbers in descending order; and

BEST MODE FOR CARRYING OUT THE INVENTION

Now, an embodiment of the present invention will be described in detail with reference to the accompanying drawings.

Here, all uplink control channels which a base station allocates to mobile stations may be collectively referred to as "PUCCH." However, for ease of explanation, mobile station-specific uplink control channels are referred to as "PUCCHs." The former PUCCH does not technically differ from the latter PUCCH, so that the present invention is applicable to either PUCCH.

Likewise, all downlink control channels which a base station allocates to mobile stations may be collectively referred to "PDCCH." However, for ease of explanation, mobile station-specific downlink control channels are referred to as "PDCCHs." The former PDCCH does not technically differ from the latter PDCCH, so that the present invention is applicable to either PDCCH.

Figure 3:
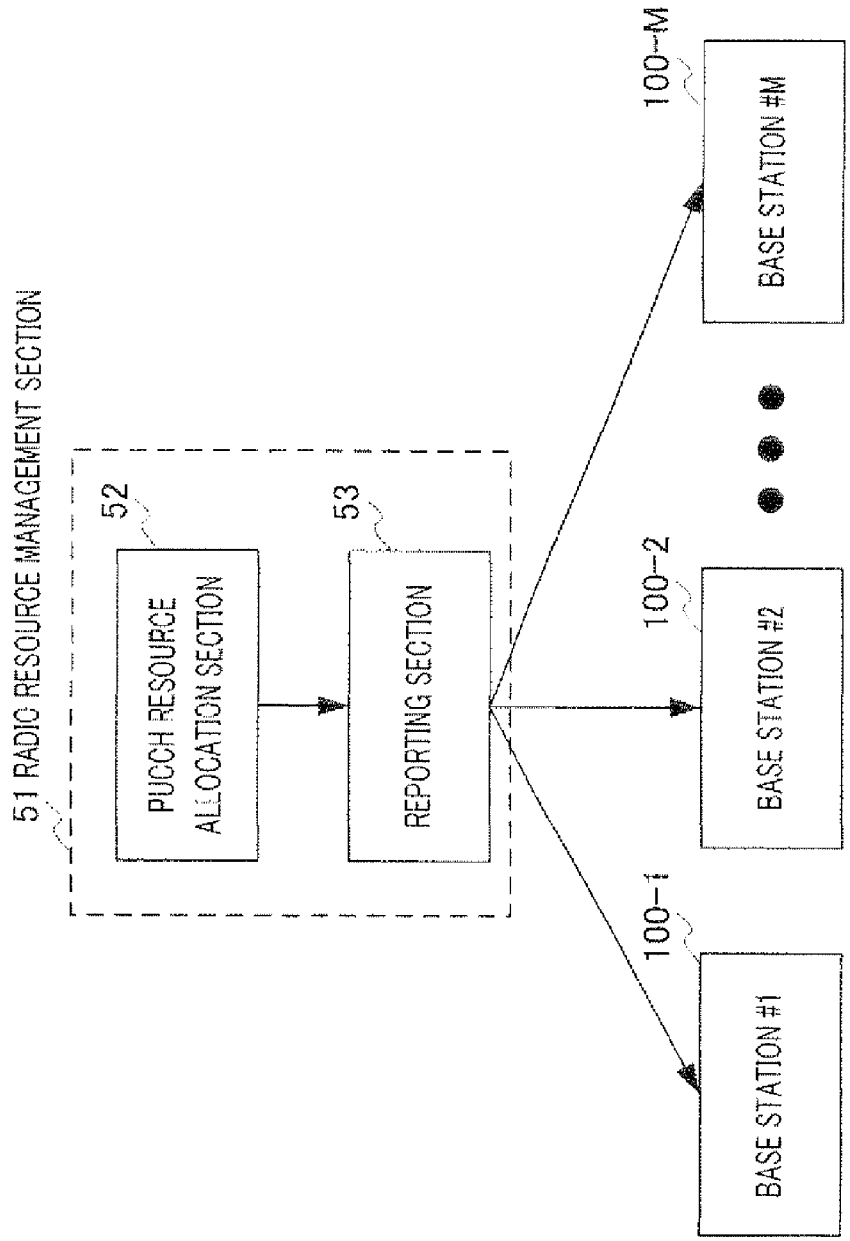
FIG. 3 is a block diagram showing a configuration of the radio communication system according to an embodiment of the present invention.

FIG. 3 is a block diagram showing the configuration of the radio communication system according to the embodiment of the present invention. In this figure, radio resource management section 51, which has PUCCH resource allocation section 52 and reporting section 53, manages radio resources allocated to a plurality of base stations (#1 to #M) 100-1 to 100-M.

PUCCH resource allocation section 52 determines radio resources for PUCCH transmission that can be used in subordinate base stations 100-1 to 100-M, to generate PUCCH resource allocation information $R_N$. When a plurality of CCEs are allocated, PUCCH resource allocation information $R_N$ includes necessary information for selecting resources used for PUCCH transmission among CCE numbers that can be used in mobile stations. The generated PUCCH resource allocation information $R_N$ is outputted to reporting section 53.

Reporting section 53 reports PUCCH resource allocation information $R_N$ outputted from PUCCH resource allocation section 52 to base stations 100-1 to 100-M.

Based on the PUCCH resource allocation information $R_N$ outputted from reporting section 53, base stations 100-1 to 100-M report the PUCCH resource allocation information $R_N$ to mobile stations in cells of the base stations by a reporting method (described later), and detect PUCCHs transmitted from the mobile stations. Base stations 100-1 to 100-M all have the same functions, and therefore, in the following explanation, the base stations will be collectively treated as base station 100.

Figure 4:
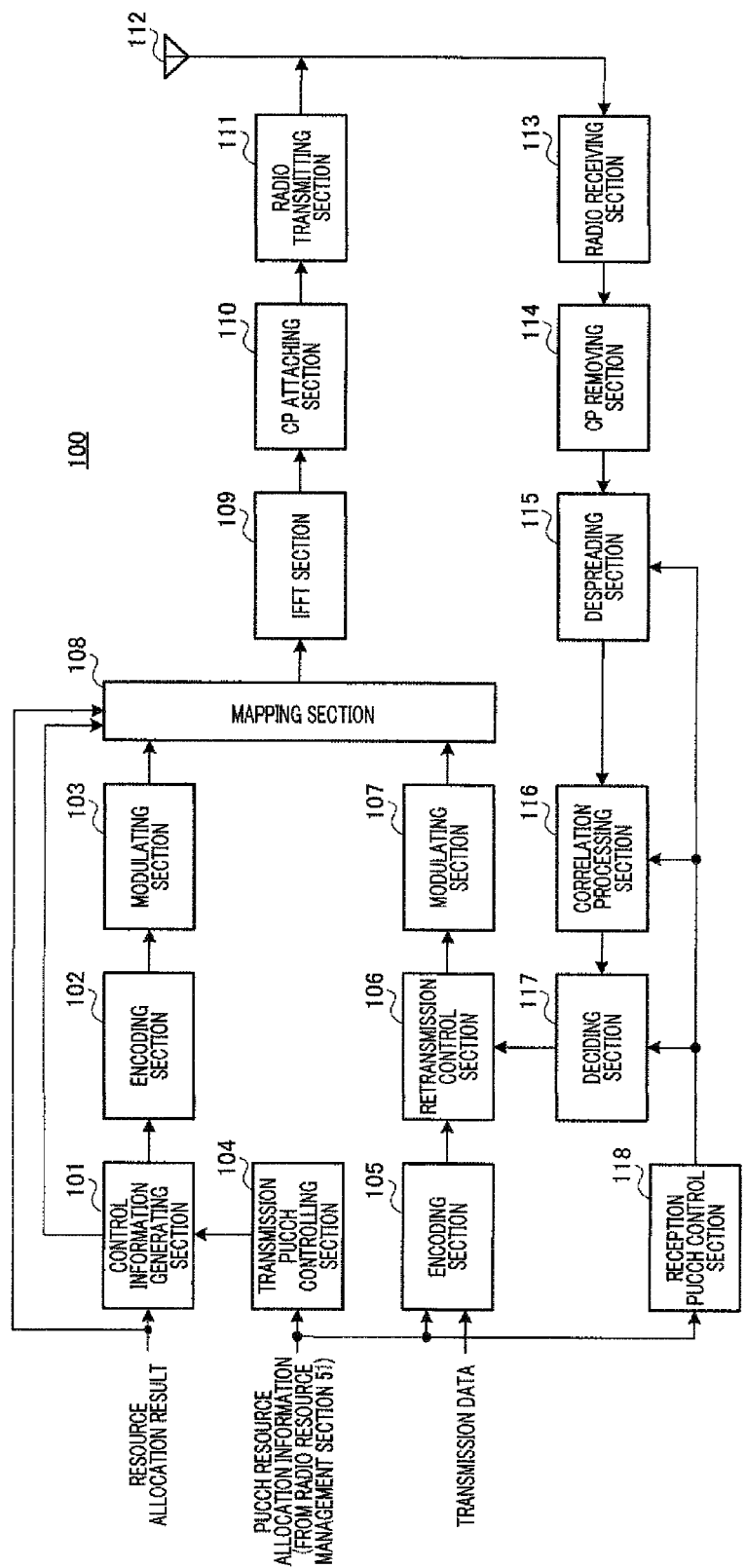
FIG. 4 is a block diagram showing a configuration of the base station shown in FIG. 3.
Figure 5:
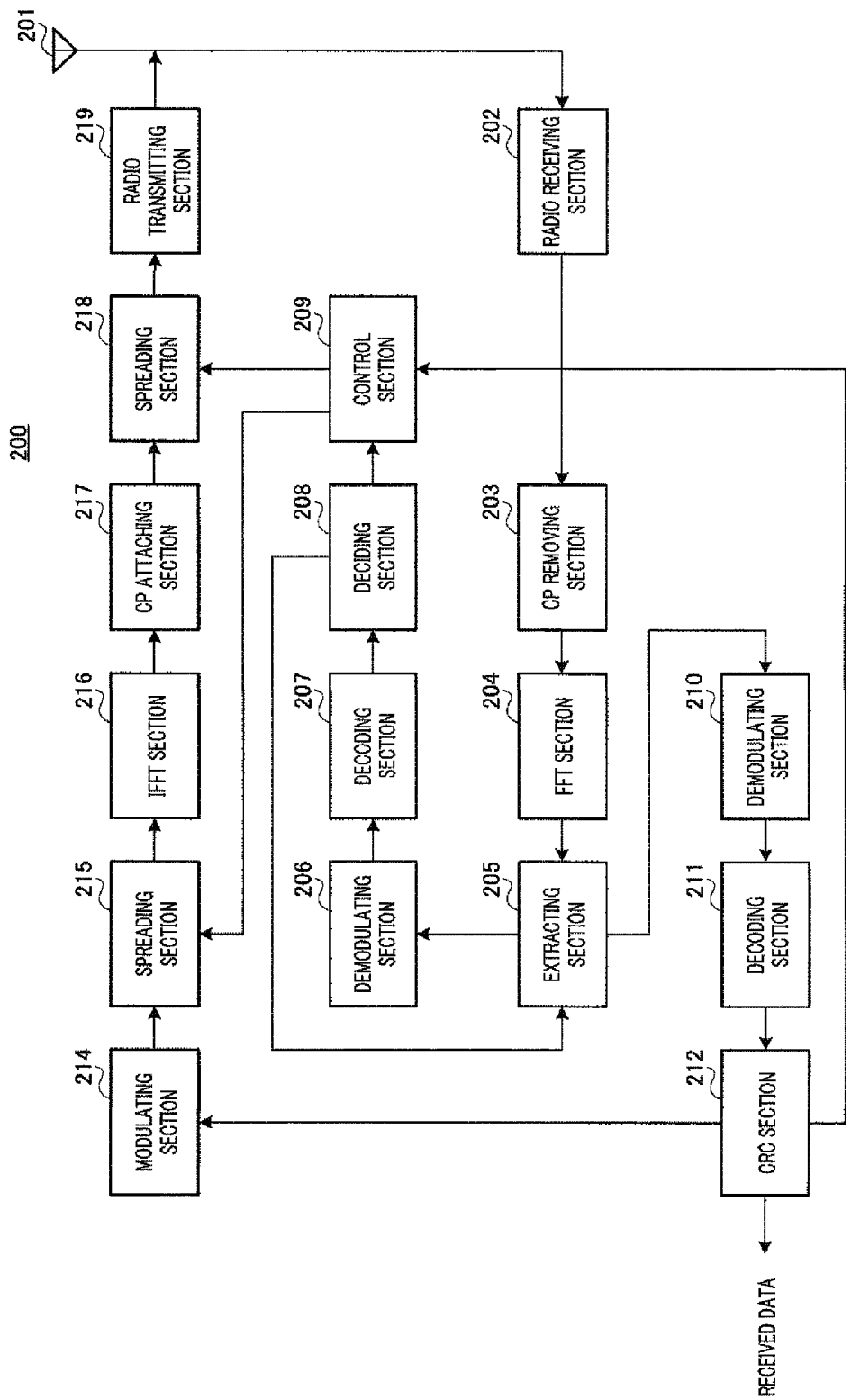
FIG. 5 is a block diagram showing a configuration of the mobile station according to the embodiment of the present invention.

Now, FIG. 4 shows a configuration of base station 100 shown in FIG. 3, and FIG. 5 shows a configuration of mobile station 200 according to the embodiment of the present invention.

To avoid complicated explanation, FIG. 4 shows components associated with transmission of downlink data and components associated with reception of uplink response signals to the downlink data, which are closely related to the present invention, and drawings and explanations of the components associated with reception of uplink data will be omitted. Likewise, FIG. 5 shows components associated with reception of downlink data and components associated with transmission of uplink response signals to the downlink data, which are closely related to the present invention, and illustration and explanation of the components associated with transmission of uplink data will be omitted.

In base station 100 shown in FIG. 4, control information generating section 101 and mapping section 108 receive as input a downlink data resource allocation result.

Control information generating section 101 generates control information for reporting the resource allocation result, on a per mobile station basis, and outputs the generated control information to encoding section 102. Control information per mobile station includes mobile station ID information to designate to which mobile station the control information is directed. For example, control information includes, as mobile station ID information, CRC bits masked by the ID numbers of mobile stations, to which control information is reported. The control information per mobile station is encoded in encoding section 102, modulated in modulating section 103 and is received as input to mapping section 108. Further, based on CCE number information outputted from transmission PUCCH control section 104, control information generating section 101 allocates PDCCHs per PDCCH of a mobile station, according to the number of CCEs (the number of occupied CCEs) required to report control information, and outputs the CCE numbers corresponding to the allocated PDCCHs to mapping section 108. Encoding section 102 and modulating section 103 changes the coding rate and the M-ary modulation number of the control information according to the number of CCEs occupied by one PDCCH.

Based on the PUCCH resource allocation information $R_N$ reported from radio resource management section 51, transmission PUCCH control section 104 determines CCE numbers of PUCCHs that can be used to transmit response signals from the mobile stations, and outputs information about the determined CCE number to control information generating section 101.

Meanwhile, encoding section 105 encodes transmission data for the mobile stations (downlink data) and the PUCCH resource allocation information $R_N$ outputted from radio resource management section 51, and outputs the encoded transmission data and PUCCH resource allocation information $R_N$ to retransmission control section 106.

Upon initial transmission, retransmission control section 106 holds encoded transmission data on a per mobile station basis, and outputs the data to modulating section 107. Retransmission control section 106 holds the transmission data until retransmission control section 106 receives as input an ACK from each mobile station from deciding section 117. Further, upon receiving as input a NACK from each mobile station from deciding section 117, that is, upon retransmission, retransmission control section 106 outputs transmission data in response to that NACK to modulating section 107.

Modulating section 107 modulates the encoded transmission data received as input from retransmission control section 106, and outputs the modulated transmission data to mapping section 108.

Upon transmission of control information, mapping section 108 maps the control information received as input from modulating section 103 to physical resources based on the CCE numbers received as input from control information generating section 101, and outputs the mapped control information to IFFT section 109. That is, mapping section 108 maps the mobile station-specific control information to the subcarriers corresponding to the CCE numbers in a plurality of subcarriers forming an OFDM symbol.

Meanwhile, upon transmission of downlink data, mapping section 108 maps the transmission data for the mobile stations to physical resources based on the resource allocation result, and outputs the mapped transmission data to IFFT section 109. That is, based on the resource allocation result, mapping section 108 maps mobile station-specific transmission data to subcarriers in a plurality of subcarriers forming an OFDM symbol.

IFFT section 109 generates an OFDM symbol by performing an IFFT for a plurality of subcarriers to which the ICI control information or the transmission data is mapped, and outputs the generated OFDM symbol to CP (Cyclic Prefix) attaching section 110.

CP attaching section 110 attaches the same signal as the signal at the tail end part of the OFDM symbol, to the head of that OFDM symbol as a CP.

Radio transmitting section 111 performs transmission processing such as D/A conversion, amplification and up-conversion on the OFDM symbol with a CP, and transmits the OFDM symbol after transmission processing from antenna 112 to mobile station 200 (in FIG. 5).

Radio receiving section 113 receives an ACK/NACK response signal transmitted from mobile station 200, via antenna 112, and performs receiving processing such as down-conversion and A/D conversion on the ACK/NACK response signal.

CP removing section 114 removes the CP attached to the ACK/NACK response signal after receiving processing.

Despreading section 115 despreads the ACK/NACK response signal by spreading codes outputted from reception PUCCH control section 118, that is, by Walsh sequences that are used for second spreading in mobile station 200, and outputs the despread ACK/NACK response signal to correlation processing section 116.

Correlation processing section 116 finds the correlation value between the ACK/NACK response signal received as input from despreading section 115, that is, the ACK/NACK response signal despread by a CAZAC sequence, and the spreading codes outputted from reception PUCCH control section 118, that is, the CAZAC sequence used for the first spreading in mobile station 200, and outputs the correlation value to deciding section 117.

Deciding section 117 performs threshold decision on the correlation values on a per mobile station basis, using a detection window set per mobile station in the time domain, thereby detecting mobile-station specific ACK/NACK response signals. For example, when the correlation value exceeds a predetermined threshold in detection window #1 for mobile station #1, deciding section 117 detects an ACK/NACK response signal from mobile station #1. Then, deciding section 117 decides whether the detected ACK/NACK response signal is an ACK or NACK, and outputs the ACK or NACK for each mobile station to retransmission control section 106.

To modulate and detect an ACK/NACK response signal corresponding to the CCE number transmitted from a mobile station and used in a cell, based on the PUCCH resource allocation information $R_N$ reported from radio resource management section 51, reception PUCCH control section 118 outputs spreading codes (i.e. cyclic shift sequences and Walsh sequences) to despreading section 115 and correlation processing section 116 and reports the detection window of the ACK/NACK signal transmitted from a mobile station upon reception, to deciding section 117.

On the other hand, in mobile station 200 shown in FIG. 5, radio receiving section 202 receives the OFDM symbol transmitted from base station 100, via antenna 201, and performs receiving processing such as down-conversion and A/D conversion on the OFDM symbol.

CP removing section 203 removes the CP attached to the OFDM symbol subjected to receiving processing.

FFT (Fast Fourier Transform) section 204 acquires control information or downlink data mapped on a plurality of subcarriers by performing a FFT of the OFDM symbol, and outputs the control information or downlink data to extracting section 205.

Upon receiving the control information, extracting section 205 extracts the control information from a plurality of subcarriers and outputs it to demodulating section 206. This control information is demodulated in demodulating section 206, decoded in decoding section 207 and is received as input to deciding section 208.

Deciding section 208 performs a blind detection of whether or not the control information received as input from decoding section 207 is directed to the mobile station. When deciding section 208 decides that control information in which CRC=OK is found (no error) is directed to the mobile station, deciding section 208 outputs the control information directed to the mobile station, that is, the resource allocation result of downlink data for the mobile station, to extracting section 205. Further, deciding section 208 decides CCE numbers associated with subcarriers to which the control information directed to the mobile station (PDCCH) is mapped, and outputs the decision result (i.e. CCE numbers) to control section 209.

Based on the CCE numbers received as input from deciding section 208 and the PUCCH resource allocation information $R_N$ received as input from CRC section 212, control section 209 decides the PUCCH that can be used to transmit a response signal of the mobile station, and controls the amount of cyclic shift of the CAZAC sequence that is used for the first spreading in spreading section 215 and the Walsh sequence that is used for a second spreading in spreading section 218, which are associated with the decision result (i.e. PUCCH numbers). That is, control section 209 sets a CAZAC sequence of the amount of cyclic shift selected based on the decision result (i.e. PUCCH numbers) in spreading section 215 and sets a Walsh sequence selected based on the decision result (i.e. PUCCH number) in spreading section 218.

Meanwhile, upon receiving downlink data, extracting section 205 extracts the downlink data directed to the mobile station from a plurality of subcarriers, based on the resource allocation result received as input from deciding section 208, and outputs the extracted downlink data to demodulating section 210. This downlink data is demodulated in demodulating section 210, decoded in decoding section 211 and received as input in CRC section 212.

CRC section 212 performs an error detection of the decoded downlink data using a CRC, generates an ACK in the case of CRC=OK (no error) and a NACK in the case of CRC=NG (error present), as a response signal. CRC section 212 outputs the generated response signal to modulating section 214. Further, in the case of CRC=OK (no error), CRC section 212 outputs the decoded downlink data as received data. Further, CRC section 212 outputs the PUCCH resource allocation information $R_N$ included in the received upper-layer control information to control section 209.

Modulating section 214 modulates the ACK/NACK response signal received as input from CRC section 212 and outputs the modulated ACK/NACK response signal to spreading section 215.

Figure 1:
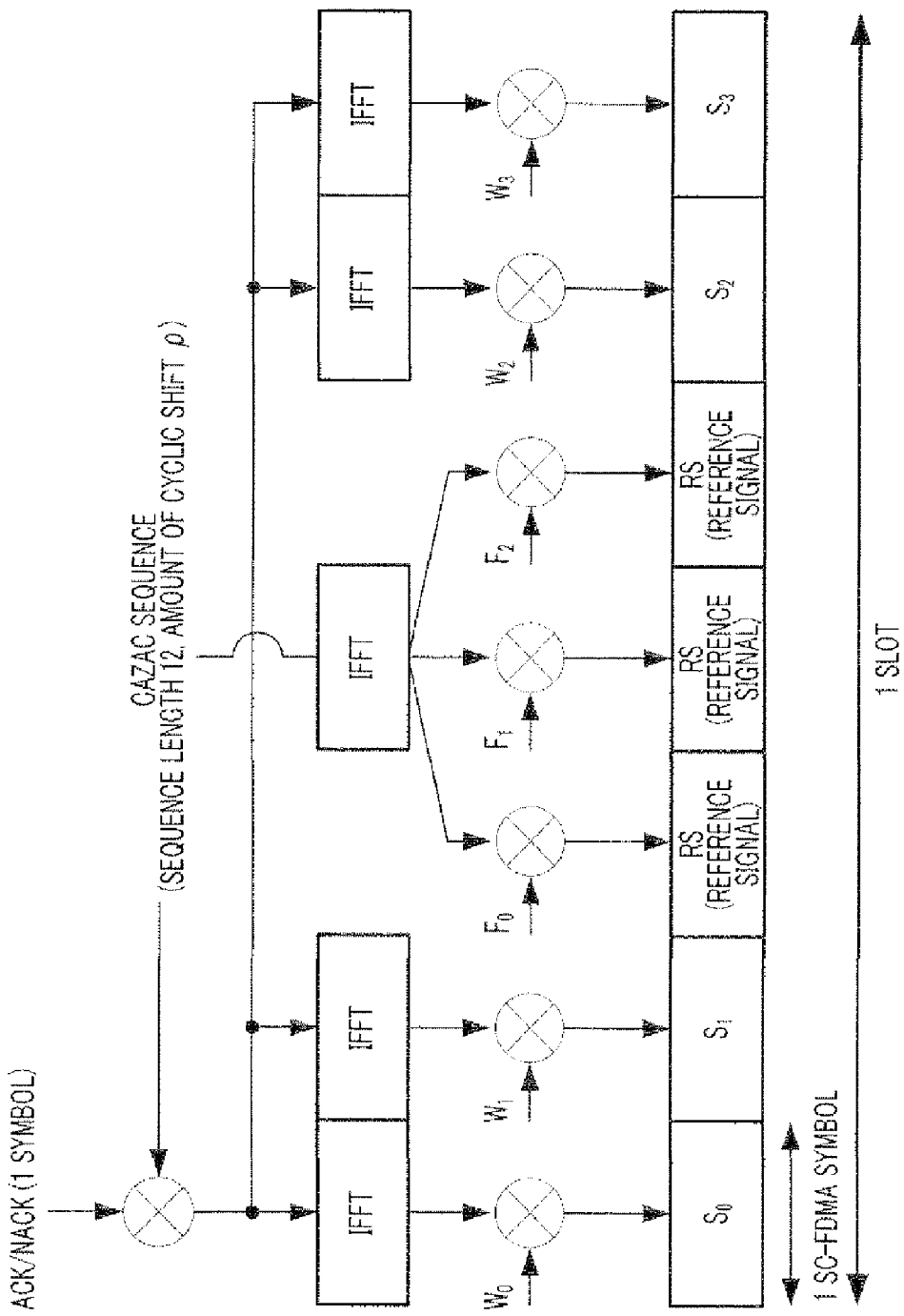
FIG. 1 shows a spreading method of an ACK/NACK signal.

As shown in FIG. 1, spreading section 215 performs first spreading of the ACK/NACK response signal by the CAZAC sequence set in control section 209, and outputs the ACK/NACK response signal subjected to first spreading to IFFT section 216.

As shown in FIG. 1, IFFT section 216 performs an IFFT of the ACK/NACK response signal after the first spreading, and outputs the ACK/NACK response signal after IFFT to CP attaching section 217.

CP attaching section 217 attaches the same signal as the tail end part of the ACK/NACK response signal after IFFT, to the head of the ACK/NACK response signal as a CP.

As shown in FIG. 1, spreading section 218 performs second spreading of the ACK/NACK response signal with a CP by the Walsh sequence set in control section 209, and outputs the ACK/NACK response signal subjected to second spreading to radio transmitting section 219.

When the received data signal carries PDCCH, that is, when the received data is subject to dynamic scheduling, spreading sections 215 and 218 set the cyclic shift sequence and the Walsh sequence that are used upon PUCCH transmission in control section 209.

Radio transmitting section 219 performs transmission processing such as D/A conversion, amplification and up-conversion on the ACK/NACK response signal subjected to second spreading, and transmits the resulting signal from antenna 201 to base station 100 (in FIG. 4).

Here, PUCCH resource allocation section 52 shown in FIG. 3 will be explained in detail. When a plurality of CCEs are allocated to one mobile station, if the mobile station transmits a response signal using only the PUCCH associated with the CCE of the smallest number among a plurality of CCEs, PUCCHs associated with CCEs other than the CCE of the smallest number are not used in a plurality of CCEs. That is, when a plurality of CCEs are allocated for one mobile station, response signal physical resources that are not used (unoccupied resources) are produced.

Then, with the present embodiment, when a plurality of CCEs are allocated to one mobile station, unoccupied resources produced as described above are allocated to a plurality of cells such that the resources are different between cells. That is, when a plurality of CCEs are allocated to an ACK/NACK signal of a mobile station subjected to dynamic scheduling, among the CCEs that can be used, CCEs to use are made different between cells.

When a plurality of CCE numbers can be used, to select one CCE number to use ACK/NACK transmission, the method of making CCEs to use different between cells includes determining $R_N$ in next equation 1 and transmitting an ACK/NACK using a PUCCH resource associated with the CCE number that makes the determined $R_N$.

$$R_N = (\text{CCE numbers that can be used } m) \bmod N \quad \text{(Equation 1)}$$

Here, N is a predetermined number (N=2, 3 and . . . ), and PUCCH resource allocation information $R_N$ is 0, 1, . . . and N=1.

To make CCEs to use between cells different, different $R_N$'s are allocated to neighboring cells. It is assumed that N in equation 1 is a value determined in the system, or known between the base stations and the mobile stations in advance as reported broadcasting information.

Next, the ACK/NACK resource allocation will be explained when N=2 in the above equation 1. A case will be assumed here where there are two cells (cells #A and #B) and where PDCCHs #0 to #4 are transmitted to mobile stations #0 to #4 in cell #A, respectively, and PDCCHs #0 to #4 are transmitted to mobile stations #0 to #4 in cell #B, respectively.

First, PUCCH resource allocation section 52 allocates $R_N=0$ to cell #A and allocates $R_N=1$ to cell #B. The PUCCH resource allocation information ($R_N=0$ and $R_N=1$) allocated to neighboring cells (cells #A and #B) is reported to the base stations of cell #A and cell #B, respectively. Based on the PUCCH resource allocation information $R_N$ reported from radio resource management section 51, transmission PUCCH control section 104 in each base station allocates PDCCHs (PDCCH #0 to #4) to CCE numbers that can be used and performs transmission. Further, each base station reports the PUCCH resource allocation information $R_N$ as higher layer control information to mobile stations.

Each mobile station receives the PUCCH resource allocation information $R_N$ reported from a base station, and, in control section 209, uses the PUCCH resource allocation information $R_N$ for determining the CCE number when a plurality of CCE numbers can be used.

Figure 6:
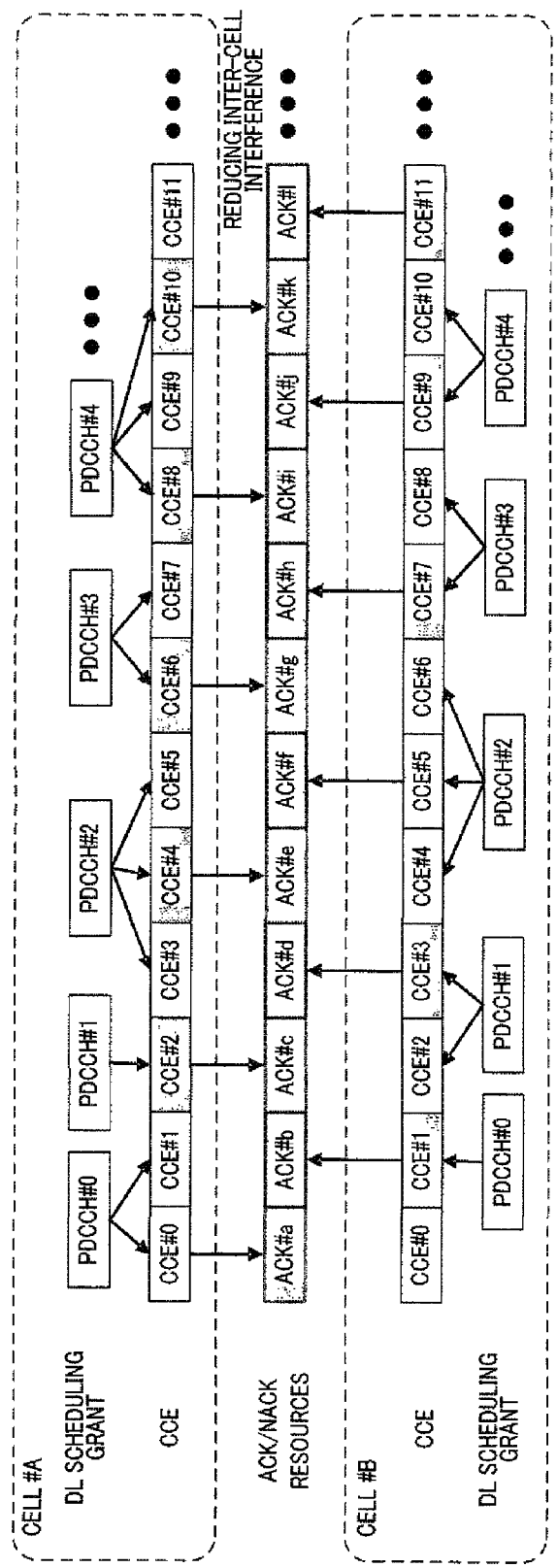
FIG. 6 shows ACK/NACK resource allocation.

In FIG. 6, mobile station #0 in cell #A receives PDCCH #0 directed to the mobile station. PDCCH #0 is transmitted using CCE number m=0 (CCE #0) and CCE number m=1 (CCE #1), and mobile station #0 in cell #A selects a CCE number to use ACK/NACK transmission. As described above, $R_N=0$ is allocated in cell #A, and therefore control section 209 selects CCE #0 that satisfies equation 1 where $R_N=0$, and transmits an ACK/NACK response signal using the cyclic shift sequence and the Walsh sequence corresponding to CCE #0 as spreading codes. Likewise, when a plurality of CCEs are allocated, mobile stations #1 to #4 in cell #A transmit ACK/NACK response signals using as spreading codes the cyclic shift sequence and Walsh sequence corresponding to CCE number m=0, 2, 4, 6 and 8 . . . to make $R_N$=0, among CCEs to which PDCCHs directed to the mobile stations are allocated.

Meanwhile, mobile station #1 in cell #B receives PDCCH #1 directed to the mobile station. PDCCH #1 is transmitted using CCE #2 and CCE #3, and mobile station #1 in cell #B selects a CCE number to use ACK/NACK transmission. As described above, $R_N$=1 is allocated in cell #B, and therefore control section 209 selects CCE #3 that satisfies equation 1 where $R_N$=1, and transmits an ACK/NACK response signal using the cyclic shift sequence and Walsh sequence corresponding to CCE #3 as spreading codes. Likewise, when a plurality of CCEs are allocated, mobile stations #0 and #2 to #4 in cell #B transmit ACK/NACK response signals using as spreading codes the cyclic shift sequences and Walsh sequences corresponding to CCE number m=1, 3, 5 and 7 . . . to make $R_N$=1, among CCEs to which PDCCHs directed to the mobile stations are allocated.

To receive and detect an ACK/NACK response signal applicable to the CCE number used in that cell based on PUCCH resource allocation information $R_N$, reception PUCCH control section 118 outputs spreading code sequence information to despreading section 115 and correlation processing section 116.

Here, $R_N$=0 in cell #A, so that the ACK/NACK response signal is subject to despread and correlation processing using the cyclic shift sequence and the Walsh sequence corresponding to CCE number m=0, 2, 4, 6 and 8 . . . as spreading codes. Likewise, $R_N$=1 in cell #B, so that the ACK/NACK response signal is subject to despread and correlation processing using the cyclic shift sequence and the Walsh sequence corresponding to CCE number m=1, 3, 5, 7 and 9 . . . as spreading codes.

When the number of CCEs is N or more, there may be a plurality of CCE numbers for ACK/NACK that satisfy PUCCH resource allocation information $R_N$ and equation 1, in this case, the CCE number selected in advance may be determined between a base station and mobile stations in advance. For example, the smallest or the greatest even CCE number may be selected. Further, the CCE determination method described in the present embodiment may be utilized recursively. That is, it is possible to define second PUCCH resource allocation information $R_N$2 for the CCE numbers that can be also used and further select the CCE number to use transmission.

Next, the effect of PUCCH resource allocation according to this embodiment of the present invention will be explained. Here, the number of CCEs per PUCCH is twelve.

Figure 7:
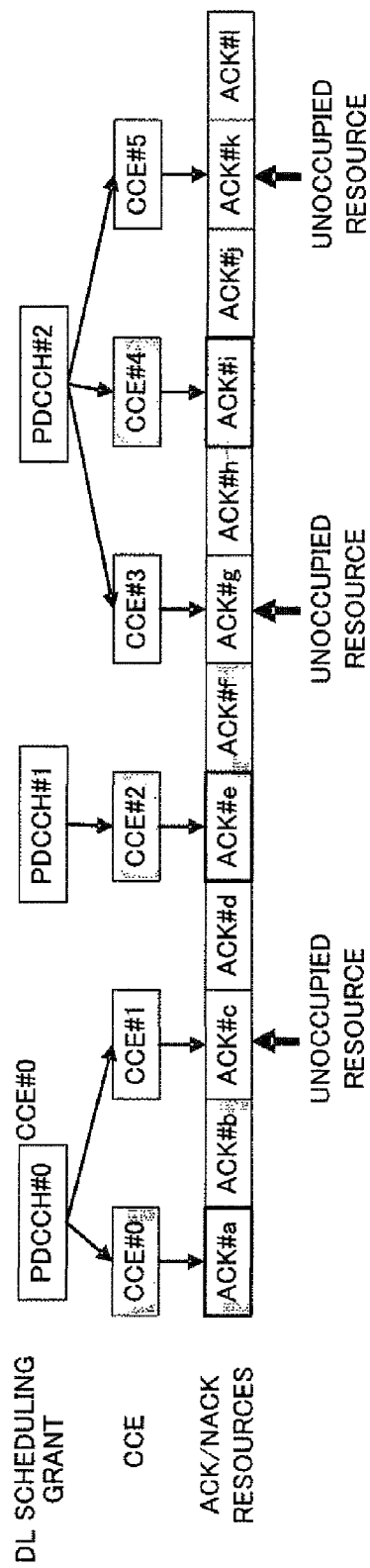
FIG. 7 shows conventional PUCCH resource allocation.

First, a conventional PUCCH resource allocation method will be explained. With a conventional method, PUCCH resources that can be used in a cell are made different between cells. For example, as shown in FIG. 7, for cell #A, every other PUCCH resource, #a, #c, #e, #g, #i and #k are allocated to CCE #0 to CCE #5, respectively. Further, for cell #B, every other PUCCH resource, #b, #d, #f, #h, #j and #i are allocated to CCE #0 to CCE #5, respectively. In this case, when a plurality of CCEs are allocated, the CCE numbers not used are generated, and, as a result, although inter-code interference between cells can be reduced, unoccupied resources are produced, and the number of ACK/NACKs that can be transmitted and the number of PDCCHs that can be transmitted in downlink are limited and the number of PUSCHs accompanied by the PDCCHs is also limited.

Figure 8:
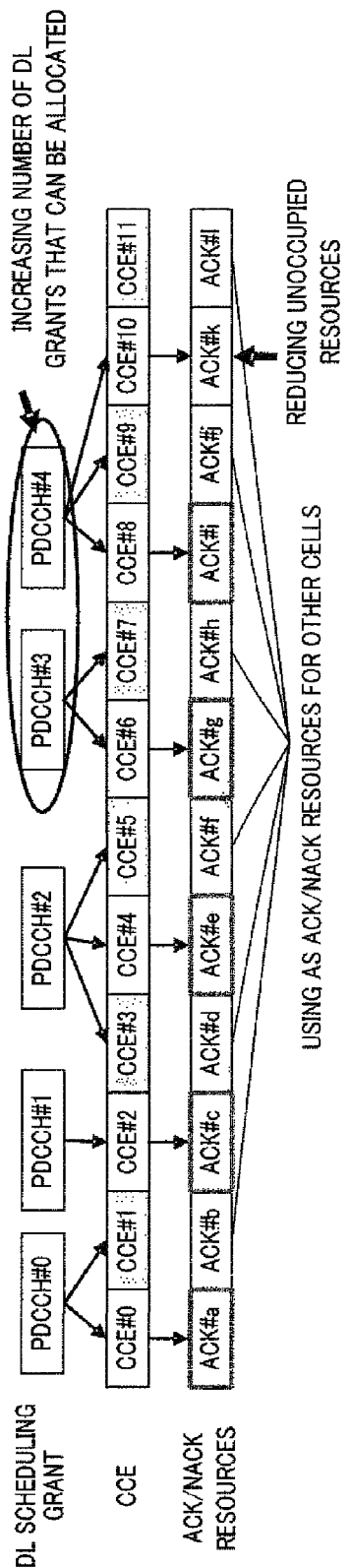
FIG. 8 shows the PUCCH resource allocation according to the embodiment of the present invention.

By contrast with this, the PUCCH resource allocation method according to the present embodiment will be explained. In this method, CCEs are associated with PUCCH resources on a one-by-one basis, and, when a plurality of CCEs are allocated, the CCE numbers that can be used in a cell are made different between cells. For example, as shown in FIG. 8, when a plurality of CCEs are allocated, cell #A holds ACK/NACK resources in advance among the number of CCEs that can be used, so as to select the even-numbered CCEs (CCEs #0, #2, #4, #6, #8, and #10) for cell #A and select the odd-numbered CCEs (CCEs #1, #3, #5, #7, #9 and #11) for cell #B as ACK/NACK resources. As a result, inter-code interference between cells can be reduced and generating unoccupied resources can be reduced, so that it is possible to increase the number of ACK/NACKs that can be transmitted and the number of PDCCHs that can be transmitted in downlink, and furthermore, to increase the number of PUSCHs accompanied by the PDCCHs compared with a conventional method.

In this way, according to the present embodiment, when a plurality of CCEs are allocated for PDCCH transmission, among CCEs that can be used, by making CCE numbers to use between neighboring cells different, it is possible to reduce the decrease in the number of ACK/NACKs that can be transmitted while reducing inter-cell interference of response signals even when a plurality of CCEs are allocated for PDCCH transmission.

Further, when the number of PDCCHs for transmission is fixed, the number of ACK/NACKs is fixed. In this case, it is possible to reduce PUCCH radio resources (i.e. time and frequency resources) and use uplink unoccupied radio resources produced by reducing the PUCCH radio resources as data transmission other than PUCCHs.

Figure 9:
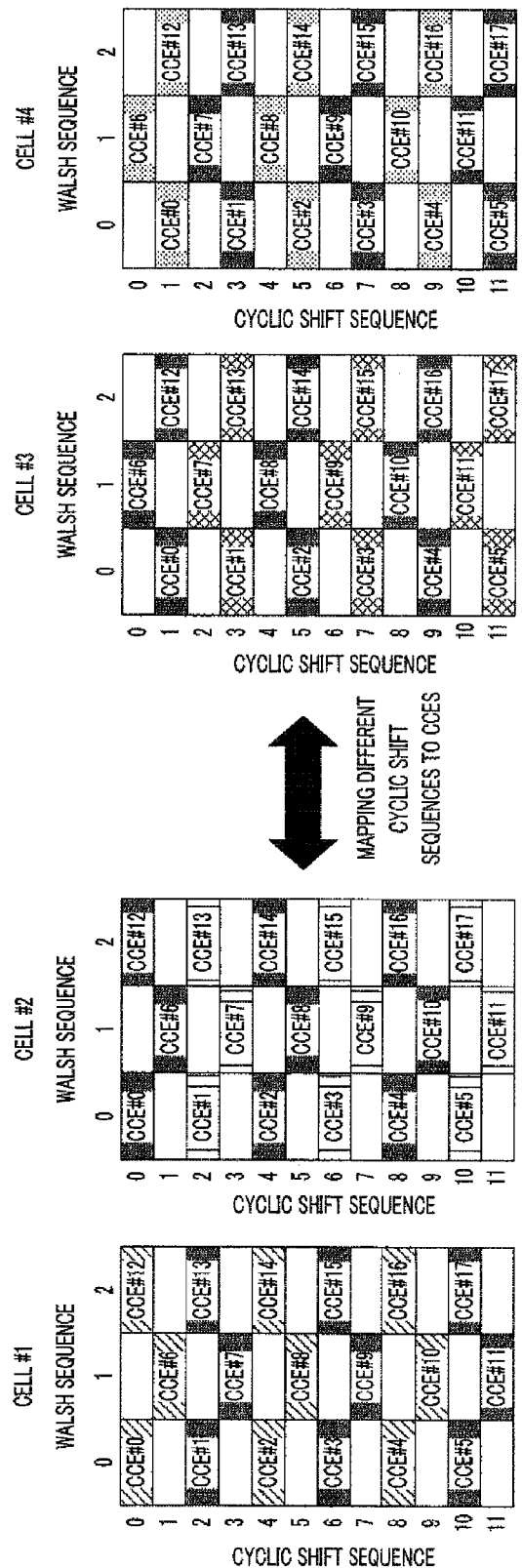
FIG. 9 shows how to apply the technique disclosed in Non-Patent Document 3 to the present invention.

As shown in FIG. 9, by combining the present invention and the technique disclosed in Non-Patent Document 3 (i.e. allocating varying cyclic shift sequences of different amounts of cyclic shift and varying Walsh sequences between cells), it is equally possible to reduce inter-cell interference.

Figures 10A, 10B:
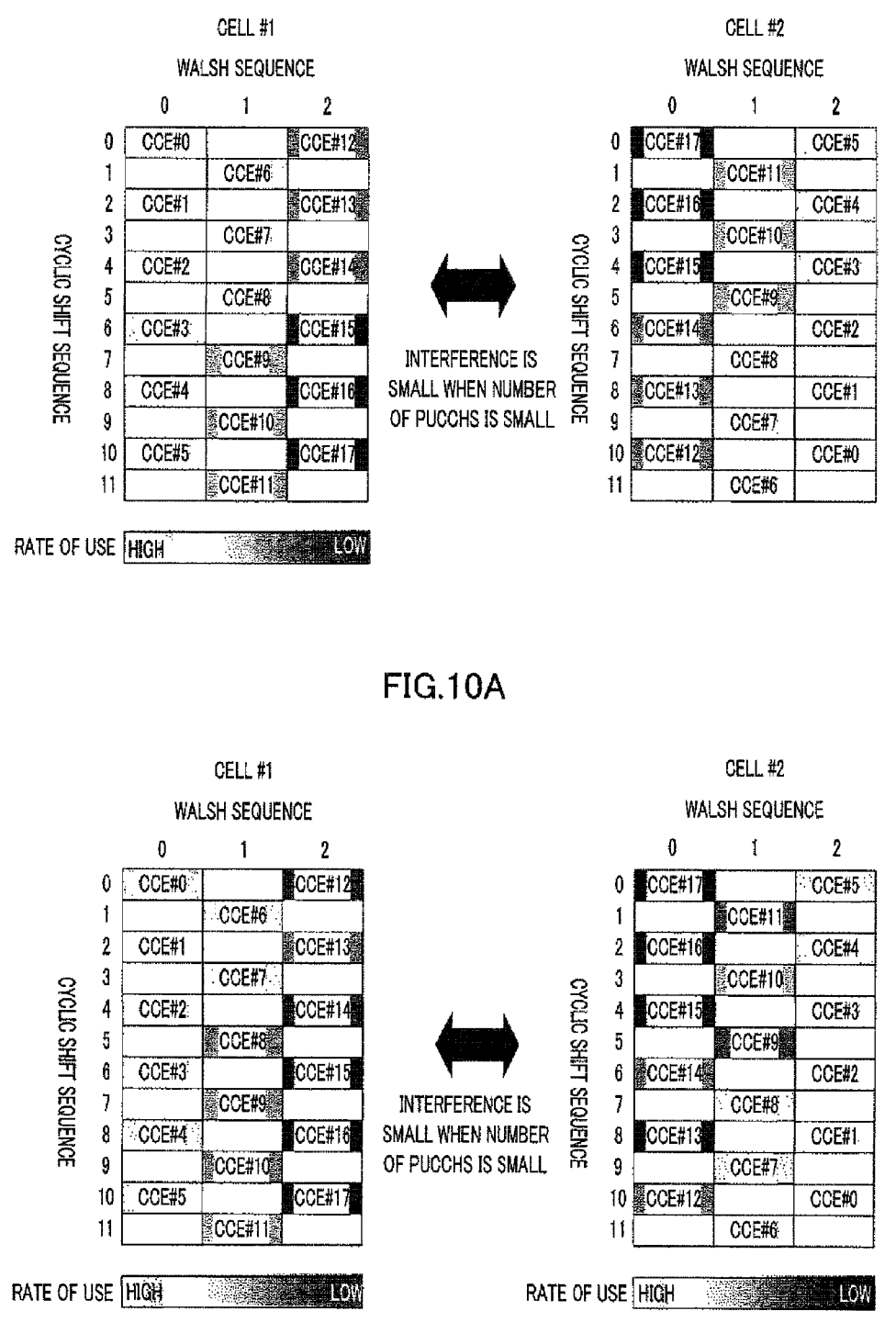

Further, by taking into account of a rate of using each CCE number, the present invention is applicable to the method of increasing the number of cells that can reduce inter-code interference between cells. Specifically, assuming that PDCCHs are allocated in ascending (descending) order of CCE numbers, the case where CCE numbers are allocated in ascending order as shown in FIG. 10A and the case where CCE numbers are allocated in descending order as shown in FIG. 10B are made different between cells with respect to cyclic shift sequence numbers and Walsh sequence numbers.

Further, although a case has been explained with the present embodiment as an example where the data part in an ACK/NACK response signal is subject to code spreading, a reference signal may be subject to code spreading by replacing a Walsh sequence with a Fourier sequence.

Further, although a case has been explained with the present embodiment as an example where a downlink ACK/NACK response signal is transmitted in uplink corresponding to CCEs in which downlink control information (PDCCH) is transmitted, the present invention is applicable to all radio resource reporting methods that use the method of determining radio resources for uplink transmission data or downlink transmission data corresponding to downlink transmission signal resources, and the present invention is not limited to PDCCHs, CCEs, ACK/NACK response signals for downlink. Consequently, it is possible to define a PDCCH as the first channel, define a CCE as a physical or logical resource allocation unit to use first channel transmission, and define an ACK/NACK response signal as a second channel.

Further, although a case has been explained with the present embodiment as an example where a downlink ACK/NACK response signal is transmitted in uplink, other data may be transmitted with the same configuration. For example, a scheduling request, a CQI and other user data may be applicable.

Further, although a case has been explained with the present embodiment as an example where a downlink ACK/NACK response signal is transmitted in uplink, the present invention may be applicable to an uplink ACK/NACK response signal transmitted in downlink.

Figure 11:
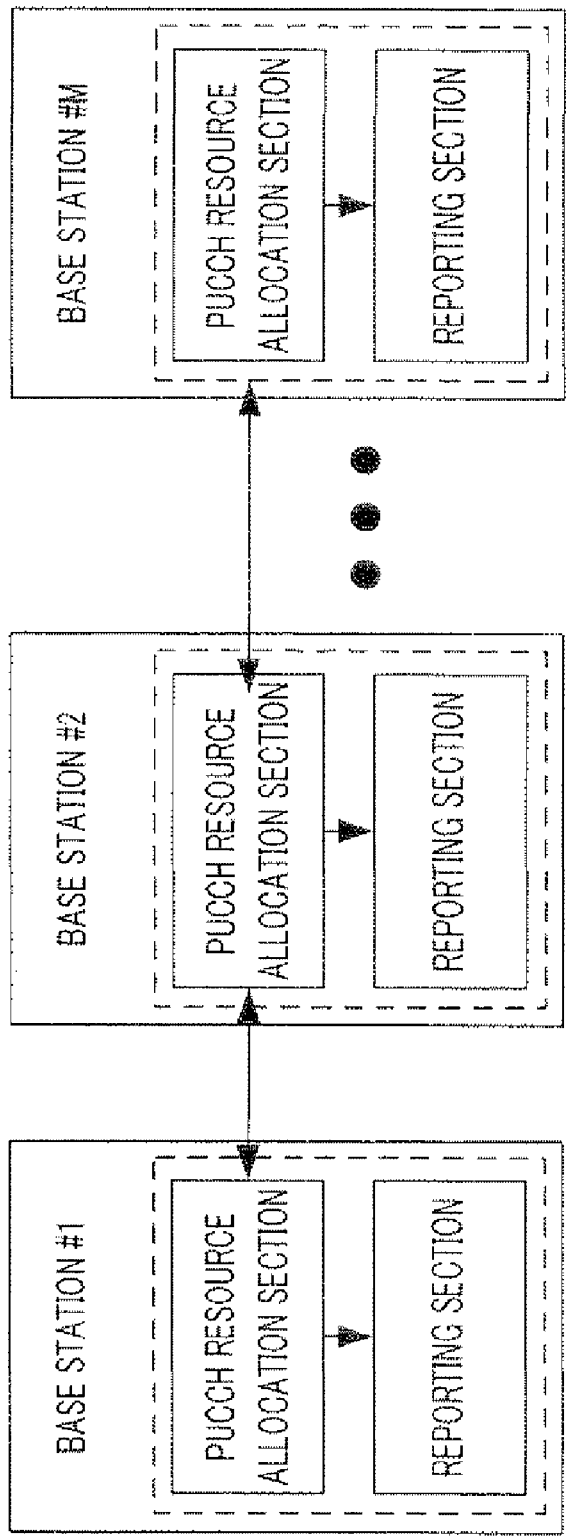
FIG. 11 is a block diagram showing a configuration of the dispersion management system.

Further, as shown in FIG. 3, although a case has been explained with the present embodiment about a central management system configuration where one system allocation section has a plurality of mobile stations, as shown in FIG. 11, the distribution management system in which base stations each provide a system allocation section and exchange information such that CAZAC sequences of varying sequence numbers are allocated between a plurality of base stations, may be configured.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-246270, filed on Sep. 21, 2007, including the specification, drawings and abstract, is incorporated herein by reference in its entirety.

INDUSTRIAL APPLICABILITY

The radio resource management apparatus, the radio communication base station apparatus and the radio resource management method according to the present invention are able to reduce the decrease in the number of ACK/NACKs that can be transmitted while reducing inter-cell interference of response signals, and, are applicable to, for example, mobile communication systems.

The invention claimed is:

1. A radio resource management apparatus, comprising:
a resource allocation section that, when a plurality of control channel elements are allocated to a physical downlink control channel for downlink data transmission, generates resource allocation information on control channel element indexes corresponding to the plurality of control channel elements, such that the control channel element indexes are different among neighboring cells; and
a reporting section that reports the generated resource allocation information to a subordinate radio communication apparatus.

2. The radio resource management apparatus according to claim 1, wherein,
the resource allocation information $R_N$ are different between the neighboring cells, and
the resource allocation section allocates control channel element index that satisfies $R_N$=(control channel element indexes that can be used for the physical downlink control channel)mod N, where N is an integer equal to or more than two, to the subordinate radio communication apparatus.

3. A radio communication base station apparatus comprising the radio resource management apparatus according to claim 1.

4. A radio resource management method comprising:
when a plurality of control channel elements are allocated to a physical downlink control channel for downlink data transmission, generating resource allocation information on control channel element indexes corresponding to the plurality of control channel elements, such that the control channel element indexes are different among neighboring cells; and
reporting the generated resource allocation information to a subordinate radio communication apparatus.

\* \* \* \* \*